United States Patent [19]

Myers

[11] Patent Number: 5,025,690

[45] Date of Patent: Jun. 25, 1991

[54] VERTICAL SPINDLE TURRET LATHE

[75] Inventor: Carl J. Myers, Mentor, Ohio

[73] Assignee: The Warner & Swasey Company, Cleveland, Ohio

[21] Appl. No.: 436,083

[22] Filed: Nov. 9, 1989

Related U.S. Application Data

[60] Continuation of Ser. No. 214,193, Jul. 1, 1988, abandoned, which is a continuation-in-part of Ser. No. 147,730, Jan. 25, 1988, Pat. No. 4,821,612, which is a division of Ser. No. 927,758, Nov. 6, 1986, Pat. No. 4,741,232.

[51] Int. Cl.$^5$ .......................... B23B 3/20; B23B 3/32; B23B 15/00

[52] U.S. Cl. ...................................... 82/121; 82/122; 82/124; 82/129; 82/901

[58] Field of Search ................ 82/117, 121, 122, 124, 82/129, 901

[56] References Cited

U.S. PATENT DOCUMENTS

| | | | |
|---|---|---|---|
| 1,556,161 | 10/1925 | Ripberger | 414/561 |
| 1,926,997 | 9/1933 | Hoelscher et al. | 82/901 |
| 2,220,425 | 11/1940 | Potter | 29/44 |
| 2,389,019 | 11/1945 | Bazley et al. | 82/122 |
| 2,889,722 | 7/1959 | Laubach | 82/122 |
| 3,703,027 | 11/1927 | Geyler | 29/39 |
| 3,742,791 | 7/1973 | Sato | 82/122 |
| 3,841,200 | 10/1974 | Berthiez | 82/122 |
| 4,051,750 | 10/1977 | Berly | 82/121 |
| 4,159,660 | 7/1979 | Buckley et al. | 82/129 |
| 4,197,769 | 4/1980 | Smith et al. | 82/129 |
| 4,250,776 | 2/1981 | Morgan | 82/122 |
| 4,354,404 | 10/1982 | Ramusino | 82/122 |
| 4,506,569 | 3/1985 | Brown et al. | 82/117 |
| 4,521,950 | 6/1985 | Kase et al. | 29/568 |
| 4,564,995 | 1/1986 | Kase | 29/563 |
| 4,665,784 | 5/1987 | Niedbala et al. | 82/149 |
| 4,738,170 | 4/1988 | Isawa et al. | 82/122 |

OTHER PUBLICATIONS

Photographs of machine tool displayed by Diedesheim in England on or about Apr. 16, 1988.

Primary Examiner—William E. Terrell
Attorney, Agent, or Firm—John R. Benefiel; Raymond J. Eifler

[57] ABSTRACT

A machine tool (100) has a spindle (101) and a turret or toolholder (124) which are disposed at the front of a base (134). A workpiece (W) is rotated by the spindle (101). The turret (124) is movable toward and away from the workpiece (W) along a path which has vertical and horizontal components. A conveyor assembly (200) is operable to move workpieces between the rear of the base (134) and the spindle (101) along a path (A) which extends through a plane (E) which contains the axis (C) of rotation of the spindle. The plane (E) is parallel to vertical and horizontal components of movement of the turret (123). An alternative embodiment (100a) of the machine tool includes a pair of spindles (101a, 301) and a pair of turrets (124a, 324) disposed at the front of a base (134a, 334). Workpieces (W9, W10) are moved two at a time between the rear of the base (134a, 334) and the two spindles (101a, 301) along a path which extends through a plane which contains the axes (C, J) of rotation of the spindles (101a, 301). A pair of chip conveyors (129a, 329) transport chips in opposite directions from the spindles (101a, 301).

5 Claims, 9 Drawing Sheets

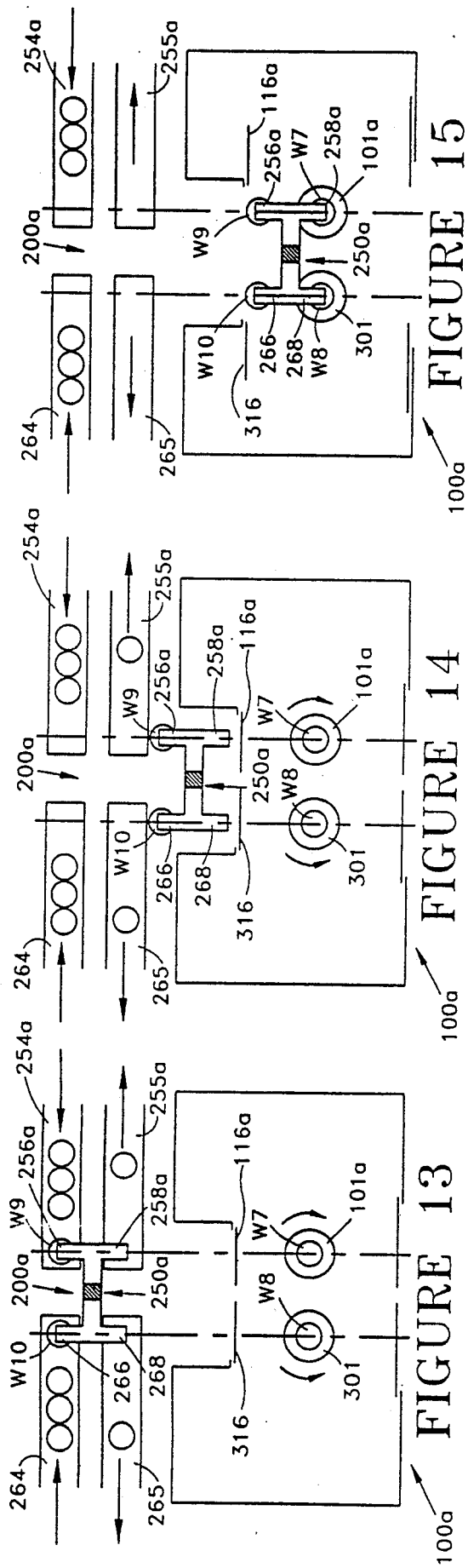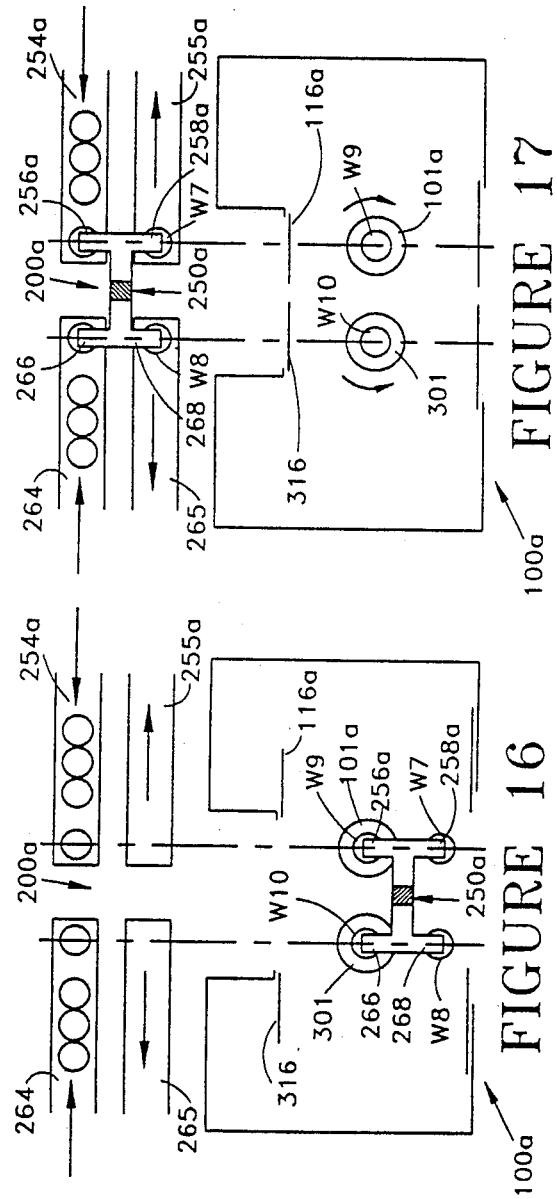

VERTICAL SPINDLE TURRET LATHE

This is a continuation of application Ser. No. 07/214,193, filed July 1, 1988, now abandoned, which is a continuation-in-part of Ser. No. 147,730 filed Jan. 25, 1988 now U.S. Pat. No. 4,821,612 which is a division of Ser. No. 927,758, filed Nov. 6, 1986 now U.S. Pat. No. 4,741,232.

This invention relates to an improved apparatus and method for use in machining workpieces. More specifically, the present invention relates to an apparatus which includes a conveyor assembly which is operable to move workpieces to and from a spindle of a machine tool.

A known vertical chucking or turning machine has a base with vertical ways along which a first or main carriage is movable. A second or turret carriage is movable along horizontal ways disposed on the first carriage. A spindle is disposed at the front of the base and is operable to rotate a workpiece about a vertical axis. One example of such a machine tool is shown in U.S. Pat. No. 2,889,722 entitled "Coolant Drain and Sealer Arrangement", issued June 9, 1959.

The relatively large upright base of this known machine tool blocks movement of workpieces from the rear of the machine tool to the spindle. Therefore, when a workpiece is to be positioned on the spindle, the workpiece is loaded from the front of the machine tool. The necessity of loading workpieces from the front of the machine tool restricts the locations where the machine tool can be placed in a building. In addition, front loading of the machine tool results in a conveyor moving workpieces through or adjacent to an operator control station.

SUMMARY OF THE INVENTION

The invention enables workpieces to be loaded and/or unloaded from either the front or the rear of a machine tool so that the machine tool can be used with many different types of workpiece loading and unloading assemblies. The location of a machine tool constructed in accordance with the present invention relative to a workpiece loading and unloading assembly can be selected to suit the space requirements in a particular building. When workpieces are loaded and unloaded from the rear of the machine tool, the workpieces do not have to move through an operator control station disposed at the front of the machine tool.

A machine tool which obtains the foregoing advantages has a toolholder or turret which is disposed at the front side of a base and is movable relative to the base along a selected path having vertical and horizontal components. A spindle is also disposed at the front of the base. A conveyor is operable to move a workpiece to and/or from the rear of the base and the spindle along a path which extends through a plane which contains the axis of rotation of the spindle and which is parallel to vertical and horizontal components of movement of the toolholder or turret.

An alternative embodiment of the invention includes a pair of toolholders or turrets which are disposed at the front of a base and are spaced apart from each other. A pair of spindles are also disposed at the front of the base and are operable to rotate the pair of workpieces. A conveyor is operable to move workpieces to and/or from the rear of the base and the first and second spindles along a path which extends between the first and second toolholders and which extends through a plane which contains the axes of rotation of the first and second spindles.

DETAILED DESCRIPTION OF THE INVENTION

Figure 3:
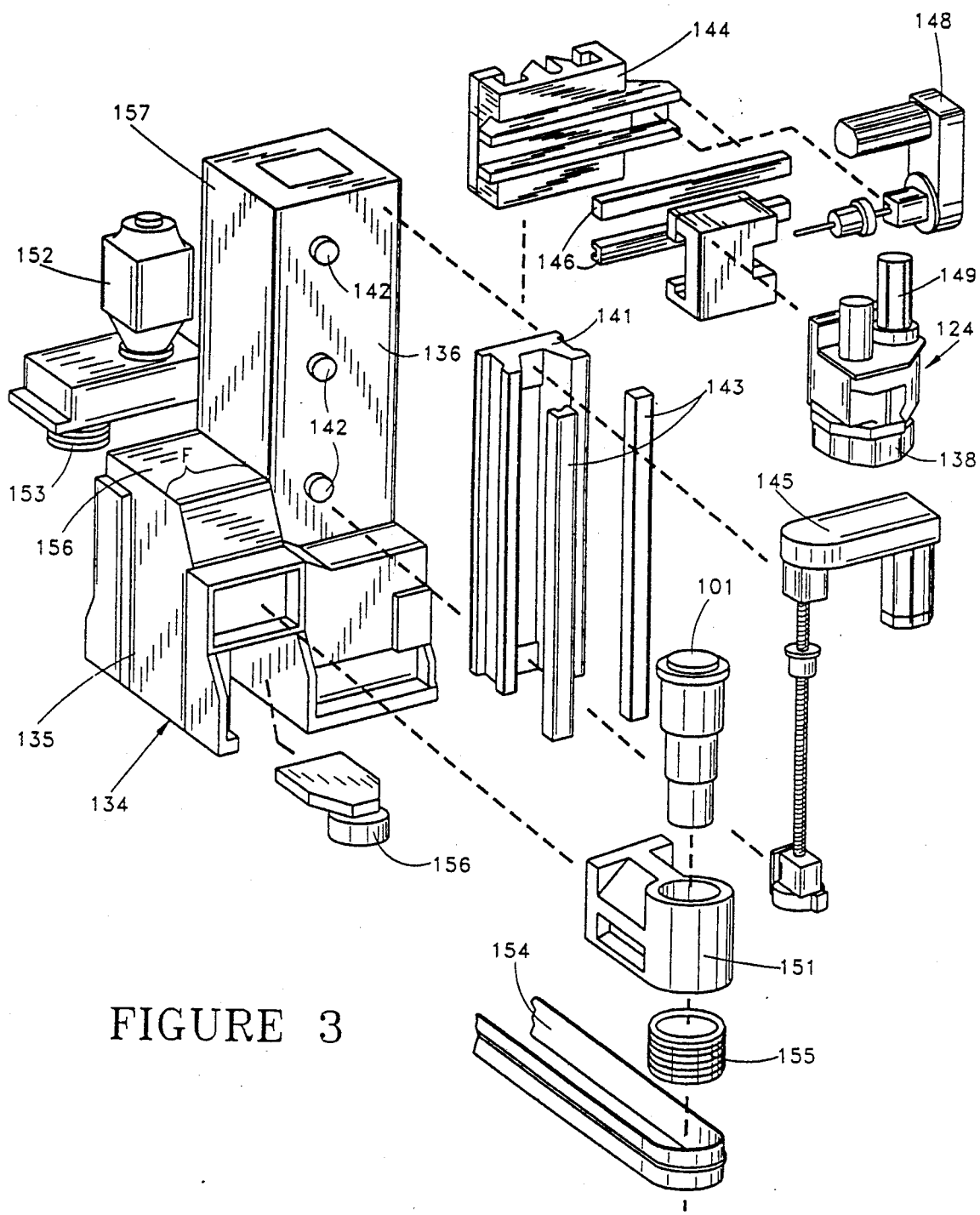
FIG. 3 is an exploded, somewhat schematicized illustration, depicting the construction and relationship between various parts of the machine tool of FIGS. 1 and 2.
Figure 11:
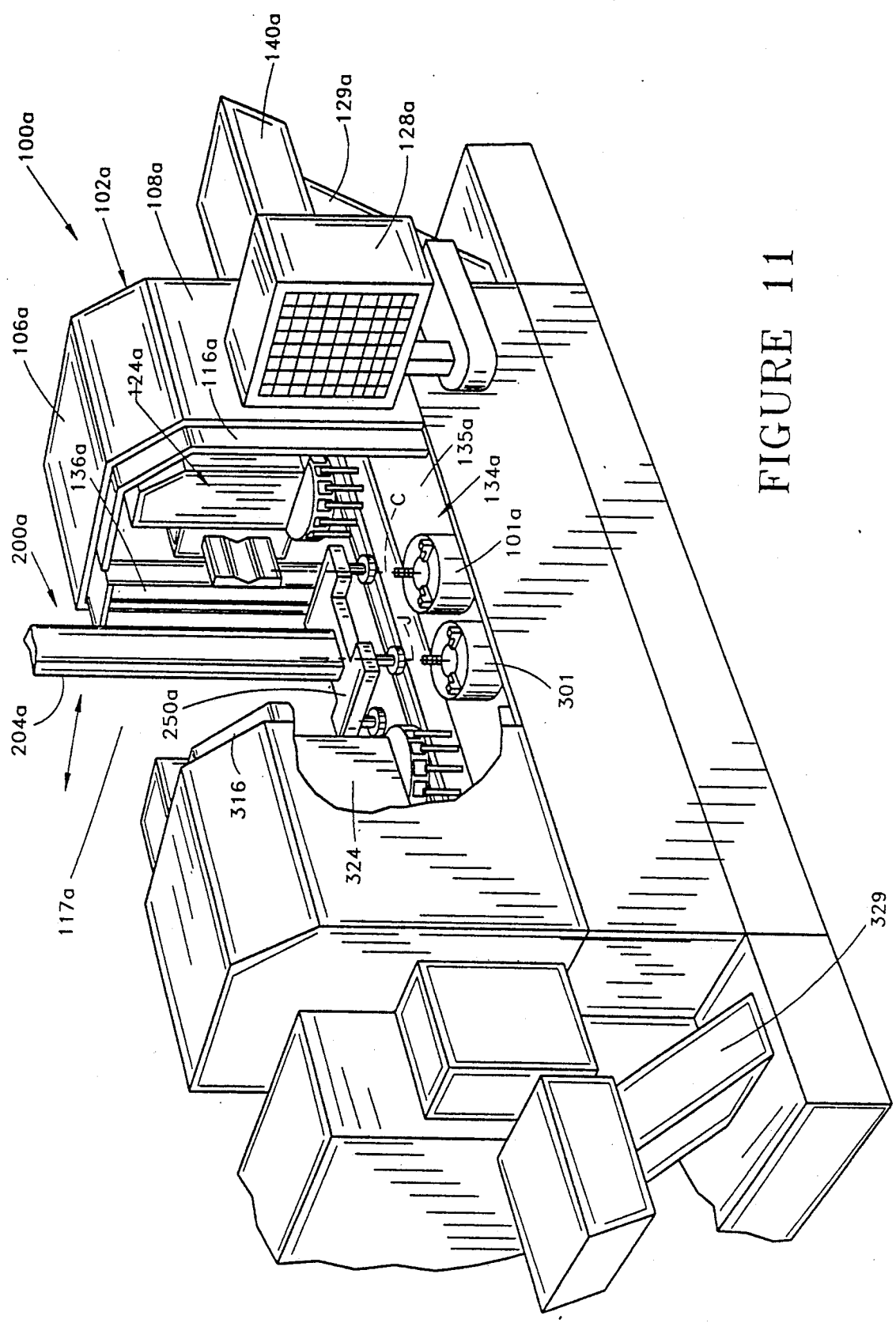
Figure 12:
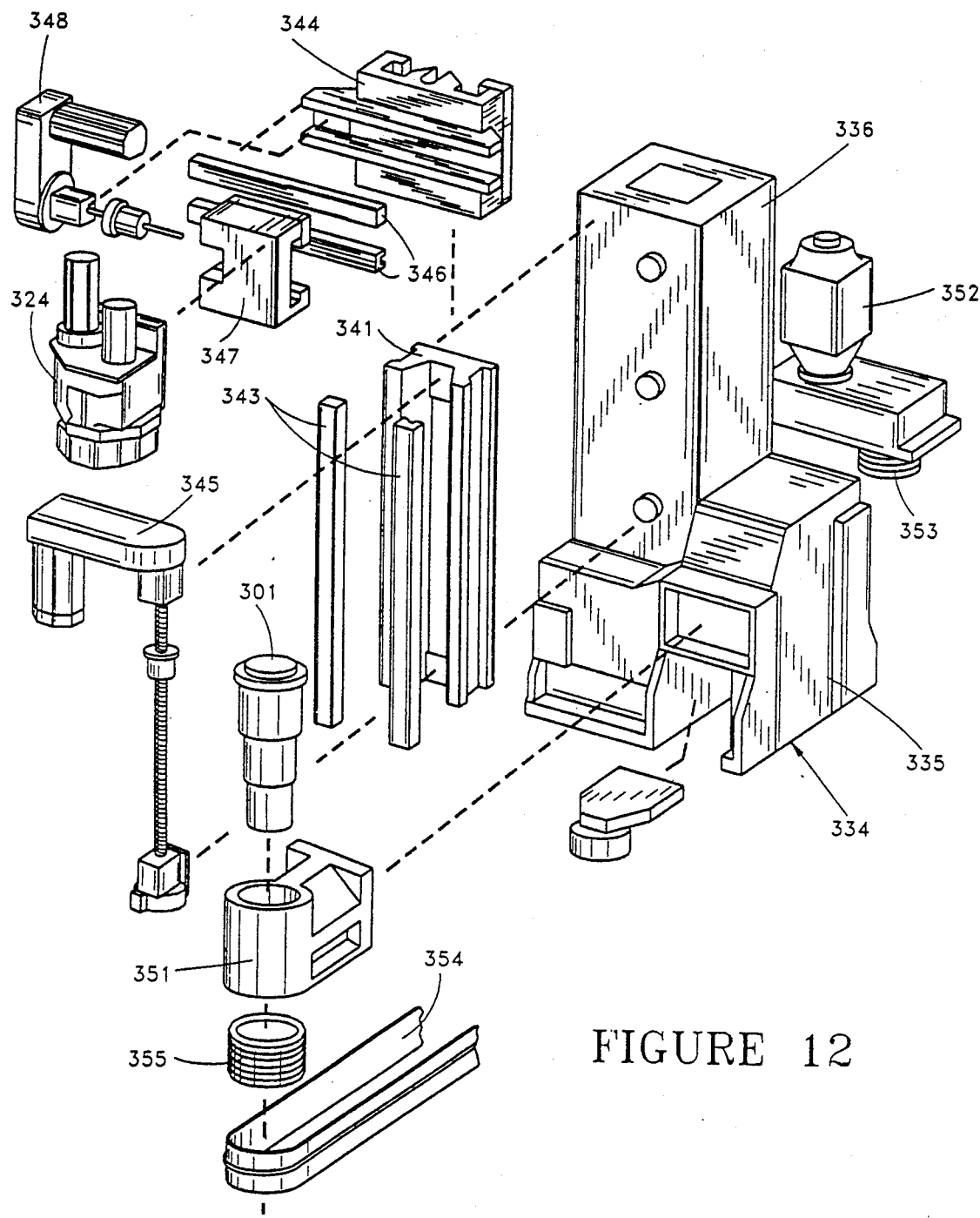

FIGS. 6, 7, 8, 9 and 10 schematically illustrate the manner in which an alternative embodiment of the conveyor assembly is used to move workpieces to and from the spindle;

FIG. 11 is a pictorial illustration of an alternative embodiment of the machine tool in which a pair of spindles and a pair of toolholders or turrets are disposed at front of a base of the machine tool;

FIG. 12 is an exploded schematicized illustration, generally similar to FIG. 3, illustrating the construction of a portion of the machine tool of FIG. 11; and FIGS. 13, 14, 16 and 17 illustrate the manner in which a conveyor assembly is used to move workpieces to and from the spindles of the machine tool of FIG. 11.

Figure 1:
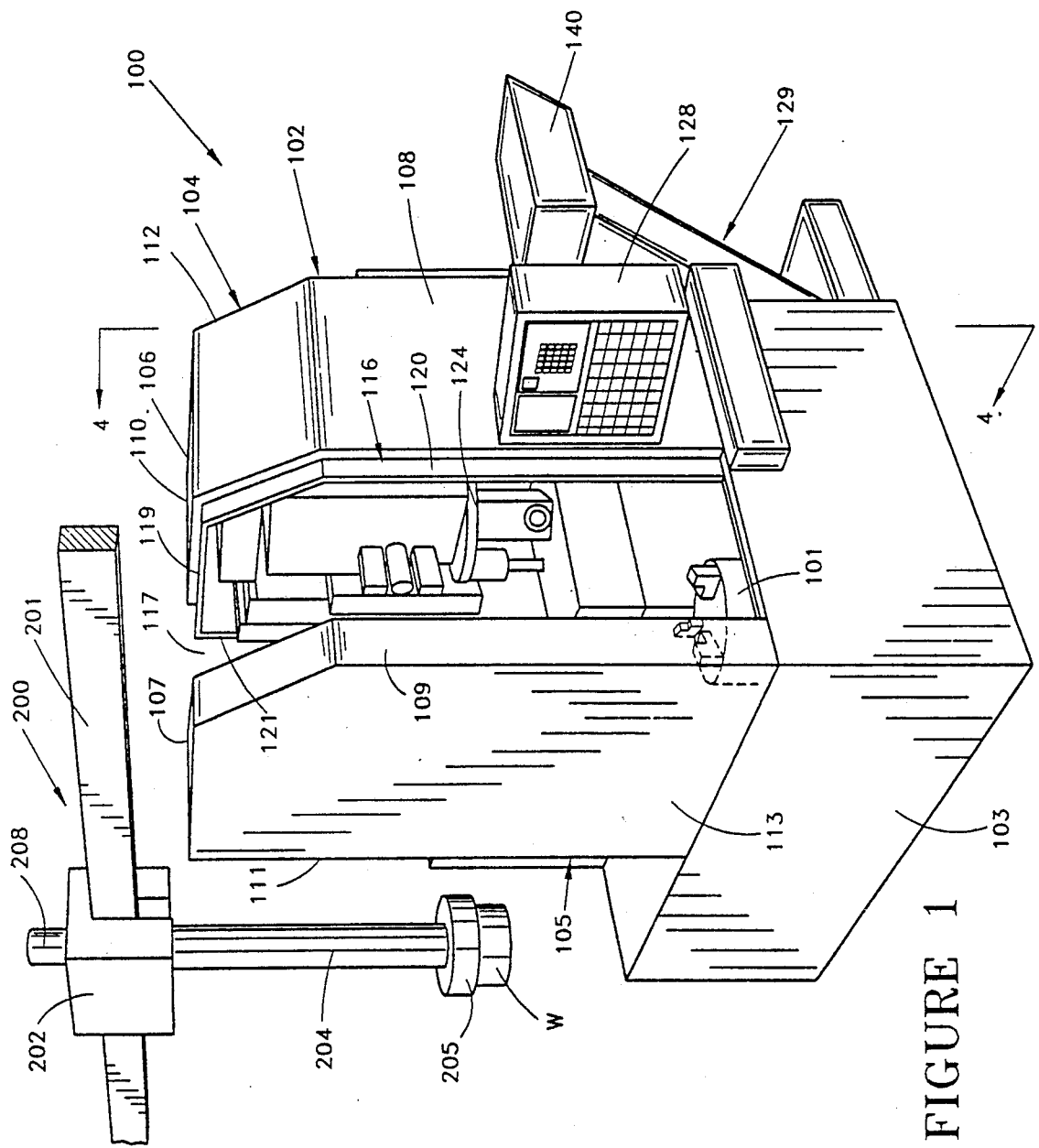
FIG. 1 is a pictorial illustration depicting the relationship between a machine tool and a workpiece conveyor assembly.

Referring now to the drawings, FIG. 1 illustrates a machine tool 100 which is operable to perform machining operations on workpieces W. A workpiece conveyor or transfer assembly 200 transports unfinished workpieces W to a spindle or chuck 101 in the machine tool 100. The workpiece conveyor assembly 200 transports an unfinished workpiece W from the rear of the machine tool 100 to the spindle 101. The conveyor assembly 200 also transports finished workpieces from the spindle 101 back to the rear of the machine tool 100. Although the conveyor assembly 200 transports workpieces to and from the rear of the machine tool 100, the conveyor assembly could be used to transport workpieces either to and/or from the front of the machine tool if desired.

An infeed conveyor assembly (not shown) may be provided to transport unfinished workpieces to the rear of the machine tool 100. An outfeed conveyor assembly (not shown) may be used to transport finished workpieces away from the rear of the machine tool 100. The conveyor assembly 200 is operable to move workpieces W to and from the spindle 101 along a linear path which extends between the rear of the machine tool 100 and the spindle 101.

The machine tool 100 includes a housing 102 which is operable between a closed condition enclosing the spindle 101 and an open condition, illustrated in FIG. 1. The housing 102 includes a base 103 with upwardly extending main sections 104 and 105. The main sections 104 and 105 of the housing have horizontal upper or top sides 106 and 107 which are supported by front side walls 108 and 109, back side walls 110 and 111 and end walls 112 and 113.

When a sliding door 116 is in the open position shown in FIG. 1, there is an opening 117 which extends across the top of the housing 102 and down opposite sides of the housing to the base 103. The sliding door 116 has a top or upper panel 119, a front side panel 120 and a rear side panel 121.

When the sliding door 116 is in a closed position blocking the opening 117, the top panel 119 extends between the upper sides 106 and 107 of the housing 102. The front panel 120 of the door 116 extends between the front side walls 108 and 109 of the housing. The rear panel 121 of the door 116 extends between the back side walls 110 and 111 of the housing. Thus, when the sliding door 116 is closed, the opening 117 is blocked so that the spindle 101 is fully enclosed by the housing 102.

When the door 116 is open, as illustrated in FIG. 1, there is a rectangular opening between the two back walls 110 and 111 of the housing 102. The rectangular opening in the back wall of the housing 102 is continued by a rectangular opening between the upper or top sides 106 and 107 of the housing. The opening in the top of the housing is continuous with a rectangular opening formed between the front side walls 108 and 109 of the housing.

A toolholder or turret 124, upon which a plurality of cutting tools are disposed, is located in the housing 102. The turret 124 is rotatable about a vertical axis extending parallel to a vertical axis of rotation of the spindle 101. In addition, the turret 124 is movable vertically along the axis of rotation of the turret. The turret 124 is also movable horizontally toward and away from the axis of rotation of the spindle 101. Tools are mounted on the turret 124 to cut a workpiece in a known manner as the workpiece is being rotated by the spindle 101. Although the illustrated machine tool 100 is a vertical chucker or turning machine, the machine tool 100 could have a different construction and spindle orientation if desired.

A control assembly 128 is provided in front of the machine tool 100 to control machining operations. During the machining operations, chips cut from a workpiece being rotated by the spindle 101 by tools on the turret 124 are carried away from the lower portion of the machine tool by a chip conveyor assembly 129.

The conveyor or transfer assembly 200 (FIG. 1) includes a horizontal overhead track 201 upon which a carriage 202 is movable. The track 201 is supported by a plurality of vertical posts (not shown). It should be understood that there are support posts at each end of the track 201.

A transfer structure 204 extends downwardly from the carriage 202. A workpiece gripper assembly 205 is disposed at the lower end of the transfer structure 204. The transfer structure can be extended and retracted to move the gripper assembly 205 vertically up and down, is that toward and away from the track 201. A transfer structure drive assembly 208 is connected with the carriage 202 and transfer structure 204. The drive assembly 208 is operable to raise and lower the transfer structure 204 and gripper assembly 205. The drive assembly 208 includes a drive motor which is connected with the carriage 202 and is operable to move the carriage 202 along the track 201. The track 201 extends across the machine tool 100. When the door 116 is in the open condition illustrated in FIG. 1, the carriage 202 can be moved along the overhead track to move a workpiece W through the opening 117 to the spindle 101.

When the apparatus of FIG. 1 is to be used to machine a workpiece W, the carriage 202 is moved to the left (as viewed in FIG. 1) end of the track 201 by operation of a drive assembly 208. The transfer structure 204 is then lowered to enable the gripper 205 to engage a raw or unfinished workpiece W at an infeed conveyor (not shown). The drive assembly 208 is then operated to move the carriage to a position over the spindle 101.

As the carriage moves to a position over the spindle 101, the downwardly extending transfer structure 204 enters the housing 102 through the portion of the opening 117 between the back walls 110 and 112 of the housing 102. Continued movement of the carriage 202 toward the spindle 101 moves the transfer structure 204 through the portion of the opening 117 between the top sides 106 and 107 of the housing 102. When the transfer structure and workpiece are in vertical alignment with the spindle or chuck 101, rightward (as viewed in FIG. 1) movement of the carriage 202 is stopped.

The drive assembly 208 is then operated to lower the transfer structure 204 and position the workpiece at the center of the spindle 101. After the workpiece has been released by the gripper 205, the drive assembly 208 is operated to move the carriage 202 toward the left (as viewed in FIG. 1). This moves the transfer structure 204 out of the machine tool 100. The sliding door 116 then moves to a closed condition blocking the opening 117 and enclosing the chuck 101 and turret 104. The machine tool is then operated to machine the workpiece W in a known manner.

Once the machining operations on a workpiece W have been completed, the door 116 is moved back to the open condition of FIG. 1. The drive assembly 209 then moves the carriage 202 along the track 201 to a position over the spindle 101. The transfer structure 204 and gripper are then in vertical alignment with the spindle 101. The transfer structure 204 is lowered slightly and the gripper 205 engages the finished workpiece W.

Once the gripper 205 has engaged the finished workpiece W, the transfer structure 204 is raised slightly to move the finished workpiece out of engagement with the spindle 101. The downwardly extending transfer structure 204 is then moved leftwardly (as viewed in FIG. 1) through the opening 117 by movement of the carriage 202 along the overhead track 201. The transfer structure 204, gripper 205 and finished workpiece W are moved out of the machine tool 100 through the portion of the opening 117 between the rear walls 110 and 111 of the housing 102.

After the transfer structure 204 and finished workpiece W have been moved out of the housing 102 and into vertical alignment with an outfeed conveyor (not shown), the transfer structure 204 is lowered to deposit the finished workpiece on the outfeed conveyor. The transfer structure is then raised and the carriage 202 is moved along the track 201 to an infeed conveyor (not shown). The conveyor assembly 200 is then operated to engage a next succeeding unfinished workpiece and move it to the spindle 101 in the manner previously described.

Since the opening 117 extends through the upper side walls 106 and 107, front walls 108 and 109 and the rear side walls 110 and 111, a downwardly extending transfer structure 204 can be moved along the track 201 between the front and back sides of the machine tool 100. This allows the infeed conveyor assembly to be mounted on one side, for example the rear of the machine tool 100, and an outfeed conveyor assembly to be mounted on the opposite side of the machine tool, such as, the front of the machine tool. However, if desired, the infeed and outfeed conveyors could be mounted at the front of the machine tool 100. In addition, if desired, the housing 102 could be modified to have infeed and/or outfeed conveyors disposed to the left (as viewed in FIG. 1) of the machine tool 100.

Figure 2:
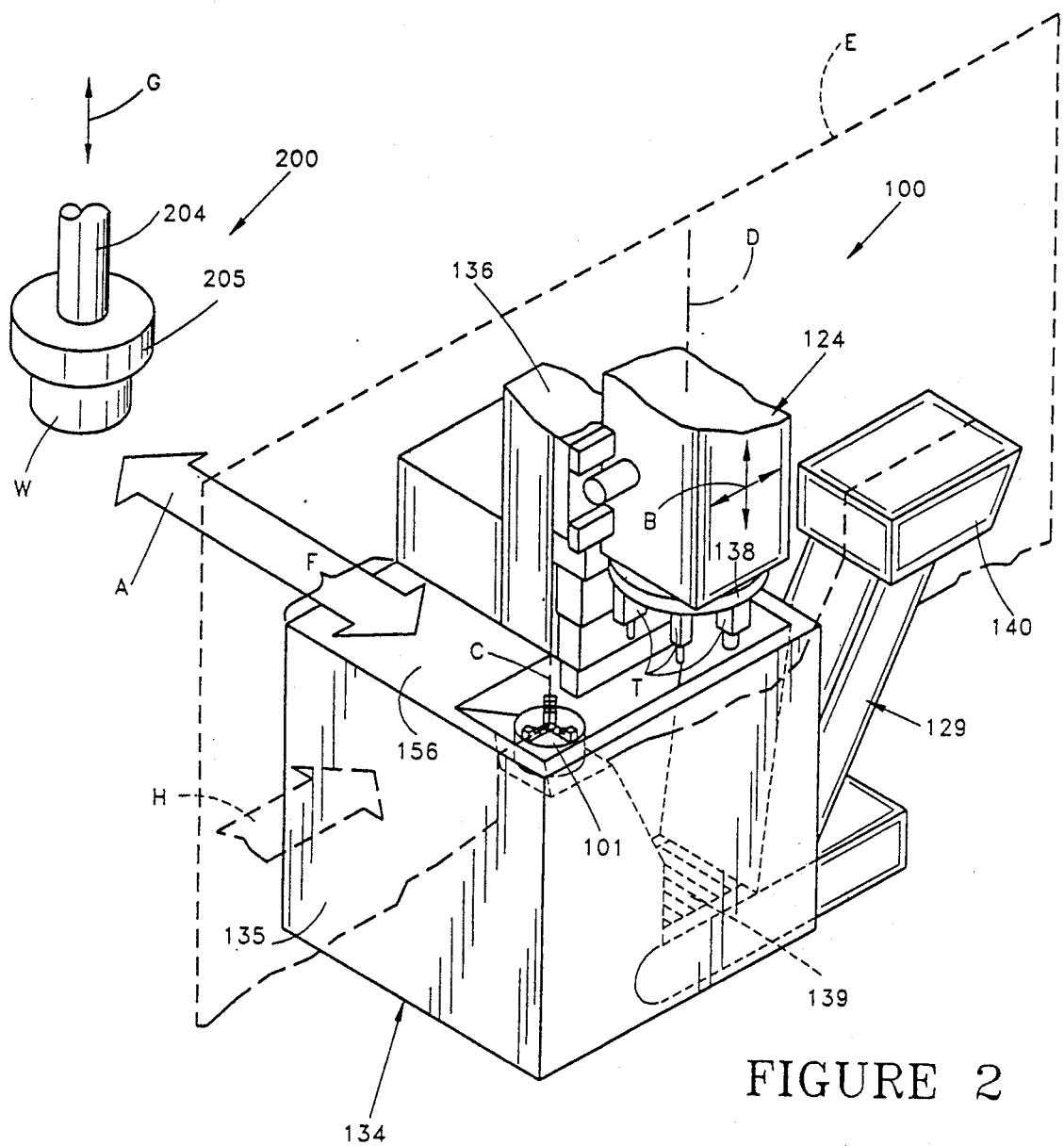
FIG. 2 is a schematic illustration of the machine tool of FIG. 1 with the housing removed and illustrating the relationship between paths along which a workpiece is moved between the rear of the machine and a spindle disposed at the front of the machine.

The relationship between the base 134, spindle 101, and toolholder or turret 124 to a path A of movement of the workpiece W is illustrated in FIG. 2. The base 134 includes a spindle support section 135 upon which the spindle 101 is mounted. The base also includes a toolholder or turret support section 136 which extends upwardly from the spindle support section.

The turret assembly is mounted on the turret support section 136 and is movable both vertically and horizontally relative to the turret support section, in the manner indicated by the arrows B in FIG. 2. Thus, the turret 124 can be moved vertically up and down to raise and lower cutting tools T relative to the spindle 101. The turret 124 can also be moved horizontally toward and away from the spindle 101. Although it may be preferred to move the turret 124 along a path having components which alternate between vertical and horizontal, the turret can be moved along a sloping path having components which are simultaneously vertical and horizontal.

The tools T on a rotatable turret head 138 engage a workpiece to cut metal from the workpiece as it is rotated about a vertical central axis C of the spindle 101. The turret head 138 is rotatable about a vertical central axis D to index a selected tool T for engagement with the workpiece. The central axis C of the spindle 101 and the central axis D of the turret 124 are disposed in a vertical plane E. The plane E is parallel to the vertical and horizontal components of the path of movement of the turret 124.

The vertically upwardly extending turret support section 136 is offset to one side of the spindle 101. This results in an open area or space F being provided above the spindle support section 135 to accommodate movement of the workpiece W to and/or from the spindle 101. Thus, the conveyor assembly 200 is operable to move the workpiece W along a straight portion of a path, indicated by the arrow A, which is above the spindle support section 135 and extends through plane E.

The workpiece W is moved along the path A by the conveyor assembly 200 with the gripper assembly 205 and workpiece W at a level which is below the turret 124. This prevents interference between the turret 124 and components of the conveyor assembly 200 or the workpiece W. As the workpiece W moves along the path A toward the spindle 101, the leading portion of the workpiece passes through the plane E until a vertical central axis of the workpiece W is disposed in the plane E and is aligned with vertical central axis C of the spindle 101.

The transfer structure 204 then continues the movement of the workpiece along the path in a downward direction to move the workpiece W into engagement with clamping jaws on the spindle 101. Thus, the workpiece W and gripper 205 are vertically movable, in the manner indicated by the arrow G in FIG. 2, by the transfer structure 204. The workpiece W is then released by the gripper 205 and the conveyor assembly 200 is moved back to the rear of the base 134.

The workpiece W is then rotated by the spindle 101 about the vertical axis C. As the workpiece rotates, the turret 124 is moved toward and away from the spindle 101 to enable the tools T to cut or machine the workpiece W. The turret head 138 can be indexed about the central axis D of the turret 124 to sequentially position the tools T for engagement with the workpiece W.

When the machining of the workpiece W has been completed, the conveyor assembly 200 moves forwardly from the rear of the base to again engage, the workpiece with the gripper 205. The transfer structure is then raised to remove the workpiece from the spindle 101. The conveyor assembly is then moved back along the path A to the rear of the base 134 to deposit the finished workpiece on an outfeed conveyor assembly (not shown). Of course, the conveyor assembly 200 could be operated to move the workpiece 200 from the spindle 101 to an outfeed conveyor adjacent to the front of the base 134 if desired. It is contemplated that it may be desirable to move the workpiece W to and/or from the spindle 101 from a location to the left (as viewed in FIG. 1) of the machine tool. If this was done, the workpiece W would be moved along a path indicated in dashed lines by the arrow H in FIG. 2.

During the machining of the workpiece W, chips or pieces of metal are cut from the workpiece. These pieces of metal fall downwardly into the chip conveyor assembly 129. The chip conveyor assembly 129 includes a conveyor 139 which moves the chips horizontally rightwardly (as viewed in FIG. 2) away from the spindle 101 and then upwardly to an outlet 140. At the outlet 140, the chips or cuttings drop downwardly into a suitable receptacle (not shown). A longitudinal central axis of the conveyor 139 is disposed in the plane E.

The construction of the base 134 and the manner in which the turret 124 and spindle 101 are mounted on the base is illustrated in FIG. 3. A vertical wayblock 141 engages support lugs 142 on the front side of the turret support section 136. The wayblock 141 is held in place by fasteners and/or cast-in-situ material in a manner similar to that described in U.S. Pat. No. 4,539,876 entitled "Machine Tool", issued Sept. 10, 1985. A pair of vertical ways 143 are mounted on the wayblock 141.

A first or main carriage 144 is movable vertically along the ways 143 by operation of a drive assembly 145 connected with the carriage. A pair of horizontal ways 146 are mounted on the carriage 144 and are engaged by a second carriage 147. The turret 124 is mounted on the second carriage 147. A drive assembly 148 is connected with the carriage 144 and the second carriage 147 to move the second carriage along the horizontal ways 146. The turret 124 includes a motor 149 which is operable to rotate the turret head 138 about a vertical axis.

A spindle mounting arm 151 is connected with the spindle support section 135 of the base 134 by fasteners and/or cast-in-situ material in the same manner as described in the aforementioned U.S. Pat. No. 4,539,876 entitled "Machine Tool", and issued Sept. 10, 1985. The spindle 101 is mounted in a cylindrical opening in the arm 151. The motor 152 drives the spindle 101 by means of a drive pulley 153, belt 154 and driven pulley 155. An idler pulley 156 is mounted on the spindle support section 135 to guide movement of the belt 154 between the drive and driven pulleys 153 and 155. Rotation of the driven pulley 155 by the belt 154 rotates a gripper assembly in the spindle 101 to rotate the workpiece in a known manner.

The turret support section 136 of the base 134 extends upwardly from the spindle support section 135 of the base. A flat horizontal upper side surface 156 of the spindle support section 134 intersects a flat vertical side surface 157 of the turret support section 136. The surfaces 156 and 157 partially define a generally rectangular open area F which extends from the upper end of the turret support section 136 to the upper surface 156 of the spindle support section 135.

The surface 156 on the spindle support section 135 of the base 134 is disposed adjacent to lower end portions of the vertical ways 143. This enables the carriage 144 to be moved upwardly along the ways 143 to a raised location where the carriage and turret 124 are out of the path of movement of a workpiece from the rear of the base 134 to the spindle 101. The offset relationship between the turret support section 136 and spindle support section 135 enables a workpiece to be moved from a location adjacent to a rear of the base 134 to the spindle assembly 101 which is disposed at the front of the base 134.

Figure 4:
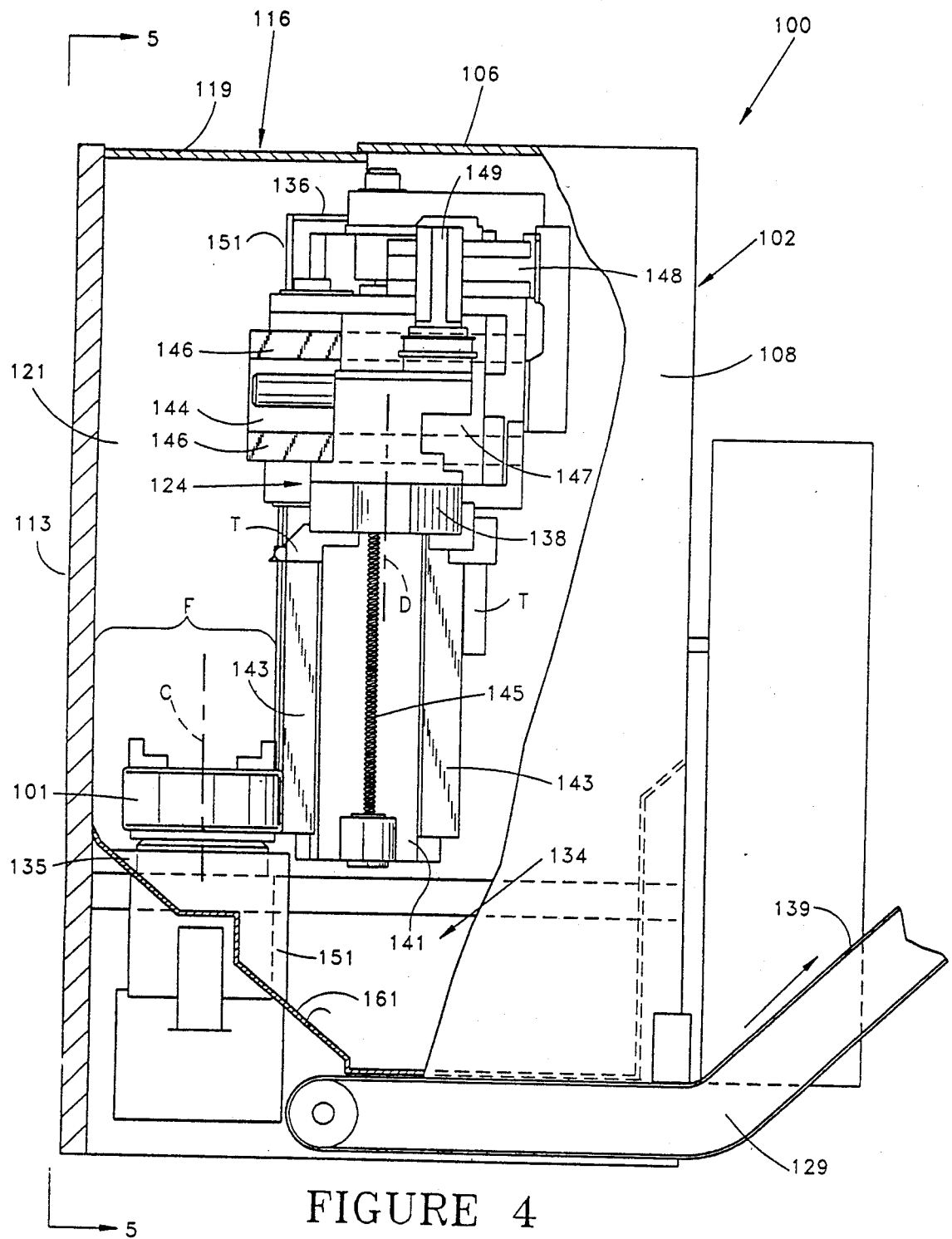
FIG. 4 is a sectional view, taken generally along the line 4—4 of FIG. 1, illustrating the relationship between a toolholder or turret and a spindle of the machine tool.

The relationship between the spindle 101, turret 124, base 134 and chip conveyor 129 is further illustrated in FIG. 4. A shield 161 slopes downwardly from the spindle 101 to the chip conveyor 129. The shield 161 directs chips from the spindle 101 to the conveyor 139 of the chip conveyor 129. The chips cut from the workpiece by the tool T as the workpiece is rotated by the spindle 101 are conducted away from the spindle by the conveyor 139 along a path which extends perpendicular to the axis of rotation of the spindle 101 and parallel to the plane E (FIG. 2) which contains the axis of rotation C of the spindle.

The turret 124 is movable up and down along the vertical ways 143 (FIG. 4) by the drive assembly 145. In addition, the turret 124 is movable back and forth along the horizontal ways 146. The axis C of rotation of the spindle 101 and the axis D of rotation of the turret 124 are disposed in the vertical plane E (FIG. 2) which extends parallel to the flat side surfaces of the ways 143 and 146. When the turret 124 is in the raised position shown in FIG. 4, the open area or space F is unobstructed so that a workpiece can be moved between the rear of the machine tool 100 and the spindle 101 by the conveyor assembly 200.

Figure 5:
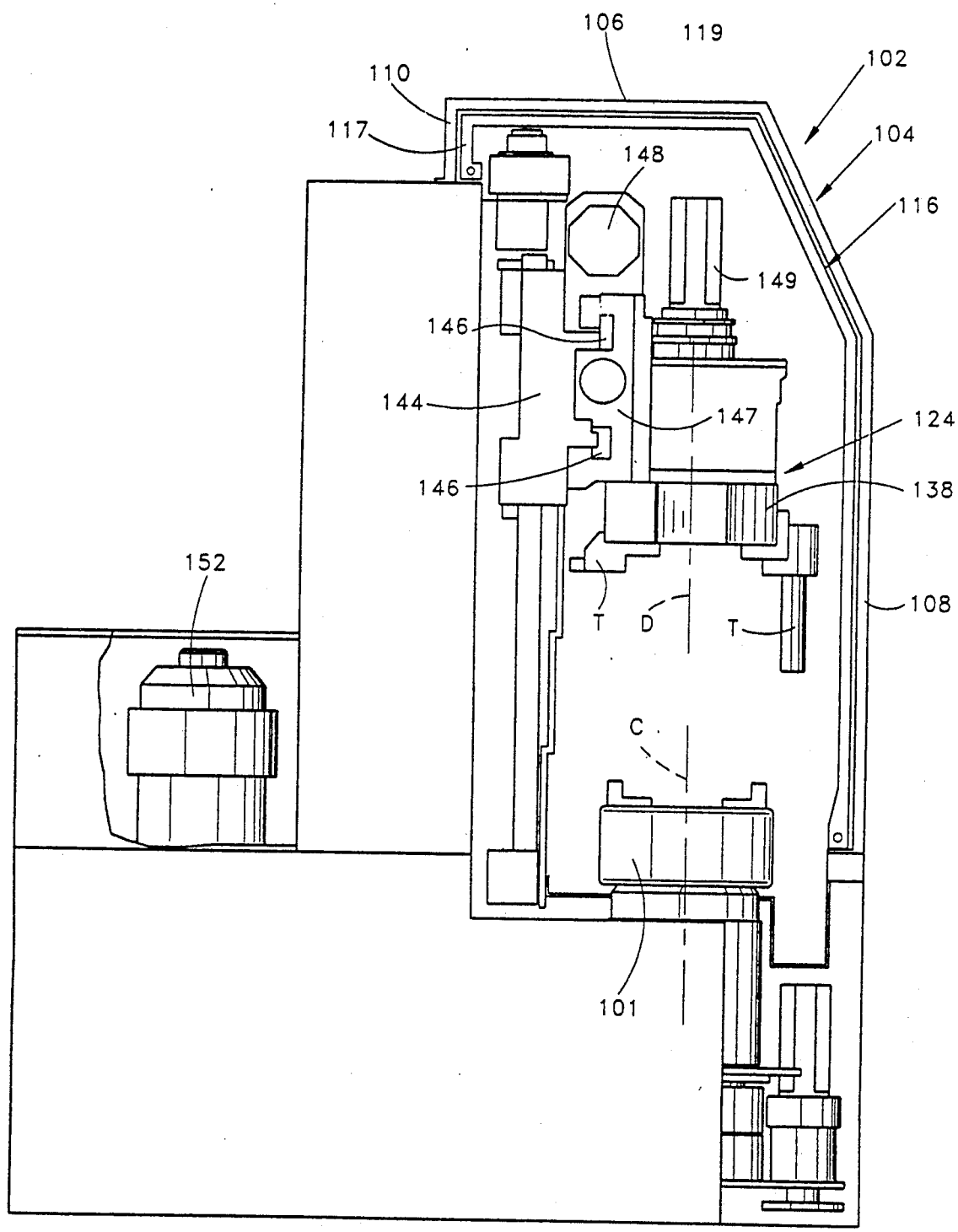
FIG. 5 is a sectional view, taken generally along the line 5—5 of FIG. 4, further illustrating the relationship between the toolholder or turret and the spindle.
Figure 6:
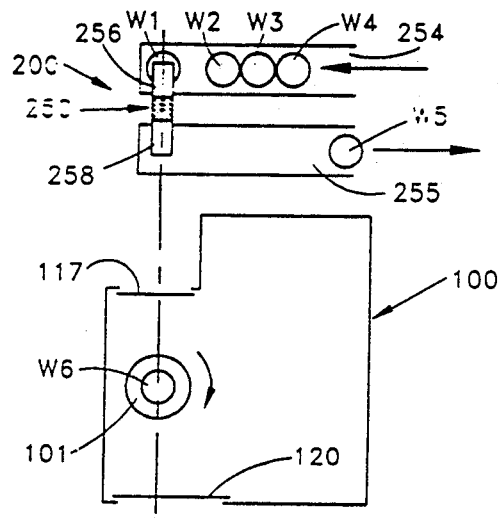

FIG. 5 further illustrates the relationship between the turret 124 and spindle 101. The vertical axis C about which the spindle 101 rotates a workpiece W is disposed in the same plane as the vertical axis D about which the turret head 138 is rotated. Of course, the central axis D of the turret is offset relative to the central axis of the spindle 101.

In the embodiment of the invention illustrated in FIGS. 1 and 2, the conveyor assembly 200 is illustrated schematically as having a single gripper 205. However, it is contemplated that it may be desirable to substitute a double gripper for a single gripper. FIGS. 6, 7, 8, 9 and 10 illustrate the manner in which a double gripper assembly 250 is used in the conveyor assembly 200 in place of the single gripper 205. An infeed conveyor 254 (FIG. 6) sequentially conducts workpieces W1, W2, W3, and W4 to the rear of the machine tool 100. An outfeed conveyor 255 moves a finished or machined workpiece W5 away from the rear of the machine tool 100.

Figure 7:
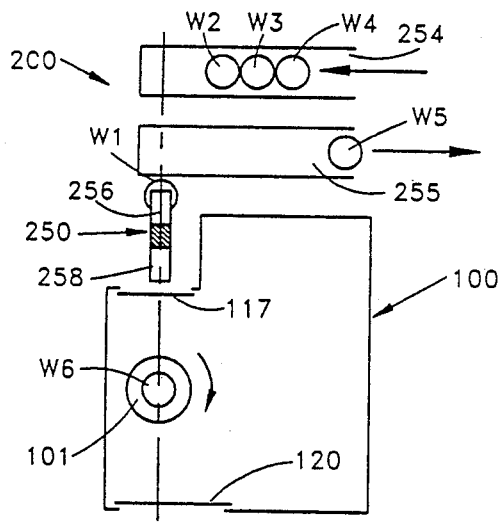
Figure 8:
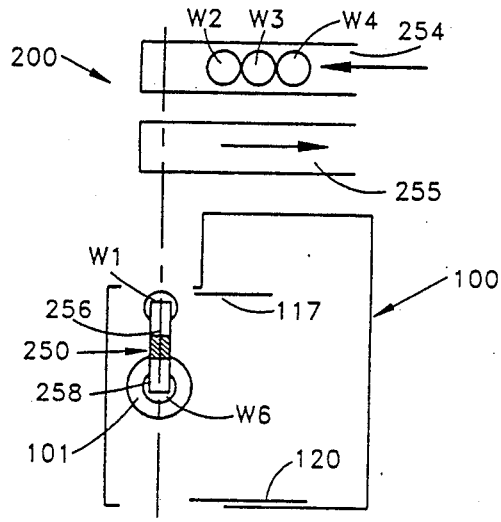

A trailing or rearward gripper 256 of the double gripper assembly 250 engages the workpiece W1 on the infeed conveyor 254 during the machining of a workpiece W6 in the machine tool 100. The conveyor assembly 200 moves the gripper assembly 250 and the engaged workpiece W1 toward the rear panel 117 of the door 116 while the workpiece W6 is being machined (FIG. 7). After the machining of the workpiece W6 has been completed, sliding door 116 is opened to retract the rear panel 117 (FIG. 8).

Figure 9:
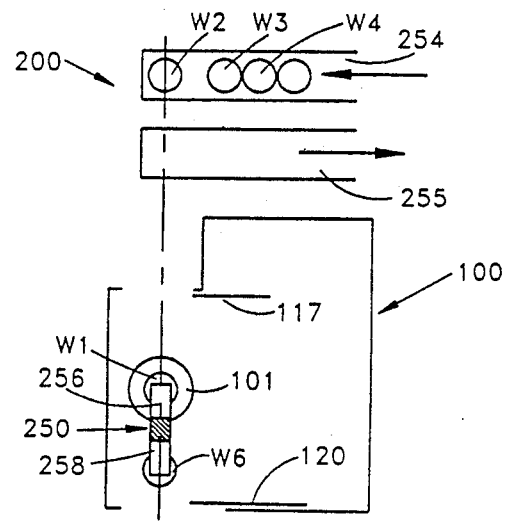

A forward gripper 258 on the double gripper assembly 250 is then moved into engagement with the finished workpiece W6. After the finished workpiece W6 has been gripped, in the manner illustrated schematically in FIG. 8, the gripper 250 is moved forwardly (FIG. 9). This moves the finished workpiece W6 away from the spindle 101. At the same time, the workpiece W1 is moved into alignment with the spindle 101.

Figure 10:
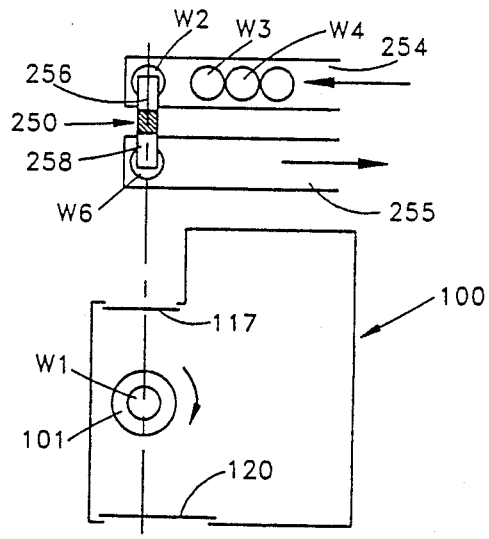

After the workpiece W1 has been gripped by the spindle 101, the gripper assembly 250 is raised so that the workpiece W6 is above the workpiece W1. The gripper assembly 250 is then moved rearwardly out of the machine tool 100 (FIG. 10). The sliding door 116 is closed and the machining of the workpiece W1 is commenced.

As the gripper assembly 250 moves rearwardly, the workpiece W6 is moved into vertical alignment with the outfeed conveyor 255. The gripper 258 is then operated to release the finished workpiece W6. At the same time, the empty gripper 256 moves into alignment with the workpiece W2 on the infeed conveyor 254. While the finished workpiece is being moved away from the gripper assembly 250 by the outfeed conveyor 255, the rearward gripper 256 is operated to engage the next succeeding workpiece W2. Once the machining of the workpiece W1 has been completed, the loading cycle is repeated with the workpiece W1 being removed from the spindle 101 and the next succeeding workpiece W2 being engaged by the spindle.

Operation

It is believed that the operation of the machine tool 100 will be apparent from the foregoing description. Thus, when a workpiece W is to be machined, it is engaged by a gripper 205 of the conveyor assembly 200 (FIGS. 1 and 2). The conveyor assembly 200 moves the workpiece W along the path A to a location adjacent to the rear of the machine tool 100. The sliding door 116 is then opened and the workpiece is moved from the rear of the base 134 toward the spindle 101 along the path A.

The path A extends through the plane E which contains the axis of rotation C of the spindle 101 and the axis of rotation D of the turret 125. The plane E is parallel to the vertical and horizontal components of movement of the turret 124. As the workpiece is carried toward the spindle 101 along the path A, the transfer structure 204 moves through the opening 117 (FIG. 1) in the housing 102.

When the workpiece W has been moved into vertical alignment with the spindle 101, the transfer structure 204 lowers the gripper 205 and workpiece so they can be engaged by jaws of the spindle chuck. The gripper 205 is then disengaged from the workpiece and moved back toward the rear of the machine tool along the path A. After the gripper 205 and transfer structure 204 have moved out of the opening 117 in the housing 102, the door 116 is closed.

The turret 124 is then moved along a path having horizontal and vertical components which extend parallel to the plane E to position the tools T for engagement with the workpiece while it is being rotated by the spindle 101. When the machining of the workpiece has been completed, the sliding door 116 is again opened and the transfer structure 204 moves into the machine tool to enable the gripper 205 to engage the finished workpiece. The gripper is then moved back along the path A to a location rearwardly of the machine tool where the finished workpiece W is deposited.

Alternative Embodiments

In the embodiment of the invention illustrated in FIGS. 1-10, the machine tool 100 has a single spindle 101. In the embodiment of the invention illustrated in FIGS. 11-17, a dual spindle machine tool is provided. Since the embodiment of the invention illustrated in FIGS. 11-17 has many components which are similar to the components of the embodiment of the invention illustrated in FIGS. 1-10, similar numerals will be utilized to designate similar components, the suffix letter "a" being added to the numerals of FIGS. 11-17 to avoid confusion.

The machine tool 100a (FIG. 11) includes a right (as viewed in FIG. 11) spindle 101a and turret assembly 124a. The spindle 101a and turret assembly 124a are mounted on the front of a base 134a having the same construction as is shown in FIG. 3. A second spindle 301 is mounted at the front of the base adjacent to the spindle 101a. A second turret 324 is mounted on the front of a second upstanding turret support section of the base.

The spindle 101a is operable to rotate a workpiece W about the vertical spindle axis C. At the same time, the spindle 301 is operable to rotate a workpiece about a vertical spindle axis J. A plane containing the two spindle axes C and J extends parallel to horizontal and vertical components of paths of movement of the turrets The conveyor assembly 200a is movable along a path extending perpendicular to the vertical plane containing the spindle axes C and J to move workpieces to and from the spindles 101a and 275. When this is to be done, a sliding door 116a and a second sliding door 316 are opened in the manner illustrated in FIG. 11. The conveyor assembly 200a then moves a pair of workpieces W from the rear of the machine tool 100a to the spindles 101a and 301. Although it is preferred to move two workpieces simultaneously to the spindles 101a and 301, the workpieces could be moved sequentially if desired.

Once the workpieces have been engaged by the spindles 101a and 301, the conveyor assembly 200a is moved rearwardly and the doors 116a and 316 are closed. The two turrets 124a and 324 are then moved under the direction of controls 128a to simultaneously machine the workpieces as they are rotated by the spindles 101a and 301. Although the conveyor assembly 200a transports workpieces to and from the rear of the machine tool 100a, the conveyor assembly could be used to transport workpieces either to and/or from the front of the machine tool 100a if desired.

The base structure for the machine tool 100a is composed of two mirror image halves. Thus, the base structure includes a right half or section 134a which has the same construction as shown in FIG. 3. The base structure also has a left half or section 334 having the construction shown in FIG. 12. The two halves 134a and 334 of the base are fixedly interconnected in a side-by-side relationship to form a unitary base structure.

The left half of the base structure (FIG. 12) includes a spindle support section 335 and an upstanding turret support section 336. A vertical wayblock 341 is mounted on the front side of the turret support section 336. A pair of vertical ways 343 are connected with the wayblock 341. A first or inner carriage 344 is movable vertically along the ways 343 by operation of a carriage drive assembly 345. Horizontal ways 346 are mounted on the carriage 344 and support a second carriage 347 for horizontal movement under the influence of a carriage drive assembly 348. The turret 324 is connected with the second carriage 347.

The spindle 301 is mounted on a spindle support arm 351 which is, in turn, connected to the front of the spindle support section 335 of the base. A spindle drive motor 352 rotates a drive pulley 353 to drive a belt 354 and pulley 355 connected with the spindle 301.

The side of the spindle support section 335 (FIG. 12) of the base 334 opposite from the vertical turret support section 336 is fixedly connected to the side of the spindle support section 135a (FIGS. 3 and 11) of the base 134a opposite from the vertical turret support section 136a. This results in the turrets 124a and 324 being disposed at opposite ends of the base and spaced apart from each other. The spindles 101a and 301 are disposed at a central portion of the base between the turret support sections and are adjacent to each other. Therefore, there is an open space between the parallel turret support sections 136a and 336 to accommodate movement of workpieces to and from the spindles 101a and 301 with the workpieces at a level below the upper ends of the upright turret support sections. If desired, the bases 134a and 334 may be constructed as steel weldments filled with concrete.

When the left and right halves 134a and 334a of the base are interconnected, the two upstanding turret support sections 136a and 336 (FIG. 11) are separated by a distance which is greater than the distance between the vertical central axes C and J of the spindles 101a and 301. This provides room for the conveyor assembly 200a to move between the two turret support sections 136a and 336. During movement of the conveyor assembly between the turret support sections 136a and 336, the turrets 124a and 324 are raised and the workpieces moved to the spindles 101a and 301 at a level which is lower than the turrets. It should be understood that the left and righthand portions of the machine tool 100a have substantially the same construction and are independently operable by the controls 128a to simultaneously machine a pair of workpieces being rotated by the spindles 101a and 301.

During the machining of workpieces, a chip conveyor assembly 129a moves chips away from the spindle 101a along a path having a longitudinal central axis which is disposed in the vertical plane containing the axes C and J of rotation of the spindles 101a and 301. A second chip conveyor assembly 329, having the same construction as the chip conveyor assembly 129a, is operable to convey chips away from the spindle 301. The chip conveyor assembly 329 has a longitudinal central axis which is also disposed in the plane containing the axes C and J of rotation of the spindles 101a and 301.

The chip conveyor assemblies 129a and 329 move chips or cuttings in opposite directions away from the spindles 101a and 301. Thus, the conveyor assembly 129a moves chips or cuttings toward the right (as viewed in FIG. 11) away from the spindle 101a. The chip conveyor assembly 329 moves chips or cuttings toward the left (as viewed in FIG. 11) away from the spindle 301. Although longitudinal axes of the paths of movement of the chips in the two conveyor assemblies 129a and 329 are aligned in the same vertical plane with spindle axes C and J, the chips or cuttings move in opposite directions.

The manner in which unfinished workpieces are transferred from infeed conveyors 254a and 264 to the spindles 101a and 301 and the manner in which finished workpieces are transferred from the spindles to outfeed conveyors 255a and 265 is illustrated schematically in FIGS. 13, 14, 15, 16 and 17. The gripper assembly 250a is generally similar to the gripper assembly 250 of FIGS. 6-10. However, the gripper assembly 250a is a tandem gripper assembly and has two pairs of grippers, that is a pair of grippers 256a and 258a which cooperate with the infeed conveyor 254a and outfeed conveyor 255a. The gripper assembly 250a also has a second pair of grippers 266 and 268 which cooperate with the infeed conveyor 264 and outfeed conveyor 265.

During the machining of a pair of workpieces W7 and W8 while they are gripped by the spindles 101a and 301, the grippers 256a and 266 engage a pair of workpieces W9 and W10 on the two infeed conveyors 254a and 264 (FIG. 13). As the machining of the workpieces W7 and W8 continues in the machine tool 100a, the gripper assembly 250a moves the workpieces W9 and W10 to a location adjacent to the rear of the machine tool 100a (FIG. 14). The path of movement of the gripper assembly 250a extends perpendicular to the vertical plane containing the axes of rotation of the spindles 101a and 301.

As soon as the machining of the workpieces W7 and W8 has been completed, the doors 116a and 316 of the machine tool 100a are opened (FIG. 15) and the gripper assembly 250a is moved forwardly into the machine tool 100a. The grippers 258a and 268 engage the two finished workpieces W7 and W8 on the spindles 101a and 301. The gripper assembly 250a then moves the finished workpieces W7 and W8 forwardly (FIG. 16) from the spindles 101a and 301 and moves the workpieces W9 and W10 to the spindles. When the workpieces W9 and W10 have been engaged by the spindles 101a and 301, the gripper assembly 250a is moved rearwardly to release the finished workpieces W7 and W8 (FIG. 17) on the outfeed conveyors 255a and 265. At this time, the grippers 256a and 266 will be aligned with the next succeeding workpieces on the infeed conveyors 254a and 264.

In the embodiment of the invention illustrated in FIGS. 11-17, a pair of spindles 101a and 301 cooperate with a pair of turrets 124a and 324. However, it is contemplated that a machine tool could be constructed with only one spindle and a pair of turrets. If this were done, one spindle, for example the spindle 101a of FIG. 11, would be disposed at the front of the base midway between the two turrets 124a and 324. The turrets 124a and 324 would be disposed on upstanding turret support sections 126a and 326 of a base and workpieces would be moved between the upstanding turret support sections of the base to the single spindle. During rotation of the workpiece by the single spindle, tools on the two turrets 124a and 324 could engage the workpiece at the same time.

Having described the invention, what is claimed is:

1. A machine tool (100) for use in machining workpieces (W), said machine tool comprising a base (134) having a first spindle support section (135) and a first toolholder support section (136) extending upwardly from said base above the level of said spindle support section (135), first way means (143) connected with said first toolholder support section and having a vertical longitudinal axis, a first carriage (144) connected with said first way means (143) and movable along said first way means, first drive means (145) connected with said first carriage (144) for moving said first carriage up and down along said first way means, second way means (146) connected with said first carriage (144), said second way means having a horizontal longitudinal axis, a second carriage (147) connected with said second way means (146) and movable along said second way means, second drive means (148) connected with said second carriage (147) for moving said second carriage (147) along said second way means (146), a first toolholder (124) connected with said second carriage (147) for holding a cutting tool, first spindle means (101) connected with said first spindle support section (135) of said base for rotating a workpiece about a vertical axis (c), said machine tool being characterized by said first tool holder (124) comprising a tool turret (124) having a vertical rotatonal axis (d) spaced from the vertical longitudinal axis of said first way means and carrying a plurality of tools (T) extending vertically therefrom, and the vertical axis (c) about which said first spindle means (101) rotates a workpiece (W) being horizontally offset to be located to one side of said first carriage (144) and said first toolholder support section (136) of said base (134), said first toolholder support section (136) being located to said one side of said first spindle means (101) and said first spindle support section (135), said machine tool components configured and said second carriage and said tool turret movable so that the area above said first spindle support section (135) extending normally to said horizontal longitudinal axis from the front completely to the rear of said machine tool is able to be completely clear of said turret structure and the other components of said machine tool to enable overhead access to said first spindle support for loading of workpieces into said first spindle means (101) from the rear of said machine tool so as to allow movement of workpieces (W) to and from said first spindle means (101) along a linear path which extends between the rear of said machine tool (10) and said first spindle means (101).

2. An apparatus as set forth in claim 1 further including chip conveyor means (129) for conducting material cut from a workpiece (W) away from said first spindle means (101) along a path extending parallel to a plane (E) within which lies the axis (C) of rotation of said first spindle means (101) and the axis of rotation (D) of said tool turret (124).

3. An apparatus as set forth in claim 1 wherein said base (134a, 334) includes a second toolholder support section (336) extending upwardly from a side of said spindle support section (135a, 335) and spaced apart from said first toolholder support section (136a), a second toolholder (334) being connected with said second toolholder support section (336), said first and second toolholder support sections (136a, 336) being spaced apart from each other.

4. A machine tool for use in machining workpieces (W), said machine tool comprising a base (134) having a first spindle support section (135) and a first toolholder support section (136) extending upwardly from said base above the level of said spindle support section (135), first way means (143) connected with said first toolholder support section and having a vertical longitudinal axis, a first carriage (144) connected with said first way means (143) and movable along said first way means, first drive means (145) connected with said first carriage (144) for moving said first carriage up and down along said first way means, second way means (146) connected with said first carriage (144), said second way means having a horizontal longitudinal axis, a second carriage (147) connected with said second way means (146) and movable along said second way means, second drive means (148) connected with said second carriage (147) for moving said second carriage (147) along said second way means (146), a first toolholder (124) connected with said second carriage (147) for holding a cutting tool, first spindle means (101) connected with said first spindle support section (135) of said base for rotating a workpiece about a vertical axis (C), said machine tool being characterized by said first tool holder (124) comprising a tool turret (124) rotatable about a vertical axis (D) and carrying a plurality of tools (T) extending vertically therefrom, and the vertical axis (C) about which said first spindle means (101) rotates a workpiece (W) being horizontally offset to be located to one side of said first carriage (144) and said first toolholder support section (136) of said base (134), said first toolholder support section (136) being located to said one side of said first spindle means (101) and said first spindle support section (135), said machine tool components configured and said second carriage and said tool turret movable so that the area above said first spindle support section (135) extending normally to said horizontal longitudinal axis from front to rear of said machine tool is able to be completely clear of said turret structure and the other components of said machine tool to enable overhead access to said first spindle support for loading of workpieces into said first spindle means (101) from the rear of said machine tool;

wherein said base (134a, 334) includes a second spindle support section (335) connected with said first spindle support section (135a) and disposed on a side of said first spindle support section (135a) opposite from said first toolholder support section (136a) and a second toolholder support section (336) extending upwardly from a side of said second spindle support section (335) opposite from said first spindle support section (35a), third way means (343) connected with said second toolholder support section (336), said third way means (343) being offset to one side of said second spindle support section (335) of said base (34a, 334) and having a vertical longitudinal axis, a third carriage (344) connected with said third way means (343) and movable along said third way means, third drive means (345) connected with said third carriage (344) for moving said third carriage up and down along said third way means, fourth way means (346) connected with said third carriage (344), said fourth way means (346) having a horizontal longitudinal axis, a fourth carriage (347) connected with said fourth way means (346) and movable along said fourth way means, fourth drive means (348) connected with said fourth carriage (347) for moving said fourth carriage along said fourth way means (346), a second toolholder (324) connected with said fourth carriage (347) for holding a cutting tool, second spindle means (301) connected with said second spindle support section (335) of said base (34a, 334) for rotating a workpiece about a vertical axis (J), the vertical axis about which said second spindle means (301) rotates a workpiece (W) being disposed horizontally offset to one side of said third carriage (144) and said second toolholder support section (336) of said base (34a, 134).

5. A machine tool as set forth in claim 4 wherein said first and second toolholder support sections (136a, 336) of said base (134a, 334) are spaced apart by a horizontal distance which is greater than the horizontal distance which the vertical axis (C, J) of said first and second spindle means (101a, 301) are spaced apart.

* * * * *